US00RE49836E

(19) United States
(12) Reissued Patent
Lin

(10) Patent Number: US RE49,836 E
(45) Date of Reissued Patent: Feb. 13, 2024

(54) WIDE BACK FLANGE HANGER

(71) Applicant: Simpson Strong-Tie Company Inc., Pleasanton, CA (US)

(72) Inventor: Jin-Jie Lin, Livermore, CA (US)

(21) Appl. No.: 15/863,626

(22) Filed: Jan. 5, 2018

Related U.S. Patent Documents

Reissue of:
(64) Patent No.: 9,228,338
Issued: Jan. 5, 2016
Appl. No.: 12/311,770
PCT Filed: Oct. 18, 2006
PCT No.: PCT/US2006/040853
§ 371 (c)(1),
(2) Date: Apr. 10, 2009
PCT Pub. No.: WO2008/048261
PCT Pub. Date: Apr. 24, 2008

(51) Int. Cl.
*E04B 1/26* (2006.01)

(52) U.S. Cl.
CPC ..... *E04B 1/2612* (2013.01)

(58) Field of Classification Search
CPC . E04B 1/185; E04B 1/21; E04B 1/215; E04B 1/2403; E04B 1/2604; E04B 1/2608; E04B 1/2612; E04B 2001/2403; E04B 2001/2406; E04B 2001/2415; E04B 2001/2684; E04B 2001/40; E04B 2001/405; E04B 7/045; E04B 7/06; E04B 7/063; E04C 3/125; E04C 2003/026
USPC ..... 52/696, 702, 704, 712, 714
See application file for complete search history.

(56) References Cited

U.S. PATENT DOCUMENTS 598,135 A 2/1898 Butz
784,218 A * 3/1905 Lane ..... E04B 1/2608 403/384
804,451 A * 11/1905 Carlson ..... 52/702
828,488 A 8/1906 Lanz
(Continued)

FOREIGN PATENT DOCUMENTS

GB 422765 6/1934

OTHER PUBLICATIONS

U.S. Patent Office, Office Action in U.S. Appl. No. 12/346,733, which issued as U.S. Pat. No. 8,555,580, dated Jun. 9, 2011, 11 pages, U.S. Patent Office, Alexandria, Virginia.

(Continued)

*Primary Examiner* — Terrence R Till
(74) *Attorney, Agent, or Firm* — James R. Cypher; Charles R. Cypher

(57) ABSTRACT

A hanger for supporting a held member from a holding member is provided with a seat member adapted for supporting the held member, first and second side members connected to the seat member, the first and second side members having lower portions and upper portions, the lower portions of the first and second side members each having inner an face and an outer face with the inner faces facing each other, and the upper portions of the first and second side members being connected to first and second back flanges respectively, the upper portions of the first and second side members each having an inner face and an outer face, and the first and second back flanges being adapted to be connected to the holding member by a plurality of fasteners, wherein the inner faces of the lower portions of the first and second side members and the inner faces of the (Continued)

upper portions of the first and second side members form reflex angles with each other.

4 Claims, 3 Drawing Sheets

(56) References Cited

U.S. PATENT DOCUMENTS

| | | | | |
|---|---|---|---|---|
| 829,234 | A * | 8/1906 | Seipp | 52/702 |
| 874,514 | A | 12/1907 | Lindow | |
| 1,406,723 | A | 2/1922 | Caldwell | |
| 2,717,801 | A | 9/1955 | Neil | |
| 3,036,347 | A | 5/1962 | Findleton | |
| 3,184,800 | A | 5/1965 | Nelson | |
| 3,601,428 | A | 8/1971 | Gilb | |
| 3,752,512 | A * | 8/1973 | Gilb | 403/190 |
| 3,972,169 | A | 8/1976 | Sheppard, Jr. | |
| 4,022,537 | A | 5/1977 | Gilb et al. | |
| 4,047,352 | A | 9/1977 | Sweet | |
| D248,275 | S | 6/1978 | Gilb | |
| 4,291,996 | A | 9/1981 | Gilb | |
| 478,163 | A | 7/1982 | Lehman | |
| 4,411,548 | A | 10/1983 | Tschan | |
| 4,480,941 | A | 11/1984 | Gilb | |
| 4,665,672 | A | 5/1987 | Commins et al. | |
| 4,717,279 | A | 1/1988 | Commins | |
| 4,744,192 | A | 5/1988 | Commins | |
| 4,802,786 | A * | 2/1989 | Yauger et al. | 403/232.1 |
| 4,841,690 | A | 6/1989 | Commins | |
| 4,890,436 | A | 1/1990 | Colonias | |
| 5,104,252 | A * | 4/1992 | Colonias et al. | 403/232.1 |
| 5,157,883 | A | 10/1992 | Meyer | |
| 5,253,465 | A | 10/1993 | Gilb | |
| 5,317,850 | A | 6/1994 | Colonias et al. | |
| 5,380,115 | A | 1/1995 | Colonias | |
| 5,448,871 | A | 9/1995 | Newman et al. | |
| 5,467,570 | A | 11/1995 | Leek | |
| 5,560,156 | A | 10/1996 | McDonald | |
| 5,564,248 | A | 10/1996 | Callies | |
| 5,603,580 | A * | 2/1997 | Leek et al. | 403/232.1 |
| 5,640,822 | A | 6/1997 | Haswell | |
| 6,158,188 | A | 12/2000 | Shahnazarian | |
| 6,230,466 | B1 * | 5/2001 | Pryor | 52/702 |
| 6,295,780 | B1 * | 10/2001 | Thompson | 52/712 |
| 6,295,781 | B1 | 10/2001 | Thompson | |
| 6,463,711 | B1 | 10/2002 | Callies | |
| 6,474,037 | B2 | 11/2002 | Thompson | |
| 6,523,321 | B1 * | 2/2003 | Leek et al. | 52/702 |
| 6,751,920 | B2 | 6/2004 | Thompson | |
| 7,014,383 | B2 | 3/2006 | Schmid et al. | |
| 7,334,372 | B2 | 2/2008 | Evans et al. | |
| 7,503,148 | B2 | 3/2009 | Lin | |
| 7,913,472 | B2 | 3/2011 | Troth et al. | |
| 8,555,580 | B2 * | 10/2013 | Vilasineekul | E04B 1/2604 52/293.3 |
| 2003/0009980 | A1 * | 1/2003 | Shahnazarian | 52/712 |
| 2004/0244328 | A1 | 12/2004 | Bak | |

OTHER PUBLICATIONS

U.S. Patent Office, Office Action in U.S. Appl. No. 12/346,733, which issued as U.S. Pat. No. 8,555,580, dated Aug. 31, 2012, 14 pages, U.S. Patent Office, Alexandria, Virginia.

International Bureau of WIPO, International Preliminary Report on Patentability with the Written Opinion of the International Searching Authority (International Searching Authority was the US) in International Application PCT/US2006/040853, published as WO2008/048261, and corresponding to U.S. Pat. No. 9,228,338, dated Apr. 22, 2009, 8 pages, International Bureau of WIPO, Geneva, Switzerland.

International Searching Authority—U.S., International Search Report in International Application PCT/US2006/040853, published as WO2008/048261, and corresponding to U.S. Pat. No. 9,228,338, dated Jun. 19, 2008, 2 pages, International Searching Authority—U.S., Alexandria, Virginia.

International Bureau of WIPO, International Preliminary Report on Patentability with the Written Opinion of the International Searching Authority (International Searching Authority was the US) in International Application PCT/US2009/069723, published as WO2010/078354, and corresponding to U.S. Pat. No. 8,555,580, dated Jul. 5, 2011, 11 pages, International Bureau of WIPO, Geneva, Switzerland.

International Searching Authority—US, International Search Report in International Application PCT/US2009/069723, published as WO2010/078354, and corresponding to U.S. Pat. No. 8,555,580, dated Mar. 15, 2010, 2 pages, International Searching Authority—U.S., Alexandria, Virginia.

TOOL-BOX-HARDWARE.COM, 'Simpson Strong Tie DTT2Z Deck Post Connector w/SDS Screws [online], Copyright 2005-2007 [retrieved on Feb. 2, 2010]. Retrieved from the internet: <URL: http://www.tool-box-hardware.com/Simpson-Strong-Tie/Simpson-Strong-Tie-DTT2Z-Deck-Post-Connector-w-SDS-Screws-B002LOJQ3A.htm>. 2 pages.

Simpson Strong-Tie Company, Inc., Wood Construction Connectors, Catalog C-2004, THA, THAC, Adjustable Truss Hangers, 1 page, Simpson Strong-Tie Company, Inc., USA.

Simpson Strong-Tie Company, Inc., Wood Construction Connectors, Catalog C-21996, Face Mount Hangers, LU, LUP, U, Hu, p. 32 and front and back covers, 3 p. Simpson Strong-Tie Company, Inc., USA.

USP Structural Connectors, Catalog p. 62, Truss Staps—HD_X series (Sanebel), 1 page, USP Structural Connectors, USA.

* cited by examiner

WIDE BACK FLANGE HANGER

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

BACKGROUND OF THE INVENTION

This invention relates to sheet metal hangers which are used to connect a held or supported member to a holding or supporting member, which are often specifically a joist or truss member connected to a truss or girder member.

Structural engineers sometime prefer that hangers for trusses be connected to the vertical members of the truss, rather than the bottom chord which is in tension. There are various hangers which have a seat for supporting the held member, vertically disposed side members for providing lateral support to the held member and one or more back flanges disposed between the width defined by the first and second side members provided with a plurality of openings for attaching the hanger to the narrow vertical web of the supporting truss member.

The present invention provides a hanger that can have first and second side members having portions that are spaced relatively close together while having first and second back flanges disposed between portions of the first and second side flanges that are relatively wide and allow for optimal spacing of fasteners used to attach the hanger to the relatively narrow vertical web of the supporting truss.

SUMMARY OF THE INVENTION

This application teaches the construction of hanger for connecting a joist or supported truss member to a supporting truss or girder.

The application teaches a hanger for supporting a held member from a holding member that is provided with a seat member adapted for supporting the held member, first and second side members connected to the seat member, the first and second side members having lower portions and upper portions, the lower portions of the first and second side members each having inner an face and an outer face with the inner faces facing each other, and the upper portions of the first and second side members being connected to first and second back flanges respectively, the upper portions of the first and second side members each having an inner face and an outer face, and the first and second back flanges being adapted to be connected to the holding member by a plurality of fasteners, wherein the inner faces of the lower portions of the first and second side members and the inner faces of the upper portions of the first and second side members form reflex angles with each other.

By forming a reflex bend in the first and second side member between the inner side faces of the upper and lower portions of the first and second side members, the hanger can be formed with first and second side members having lower portions that are spaced relatively close together to provide support to a narrow supported member, while having inwardly bent back flange members that are connected to the upper portions of the first and second side members and that have lower portions that are disposed between the upper portions of the first and second side members and those lower portions of the first and second back flanges between the upper portions of the first and second side flanges span a width that is greater than the width between the lower portions of the first and second side members, allowing those lower portions of the back flange members to be relatively wide without having to overlap each other, and which also makes it easier to adequately space multiple fasteners in the lower portions of the back flange members.

In the preferred form the hanger is formed with a continuous single seat. In the preferred form, the hanger is made from a single blank of sheet metal and is formed by bending the blank into its three dimensional form. In the preferred form, the hanger is made from galvanized sheet steel and requires no welding in its fabrication or painting for protection.

DETAILED DESCRIPTION OF THE INVENTION

Figure 2:
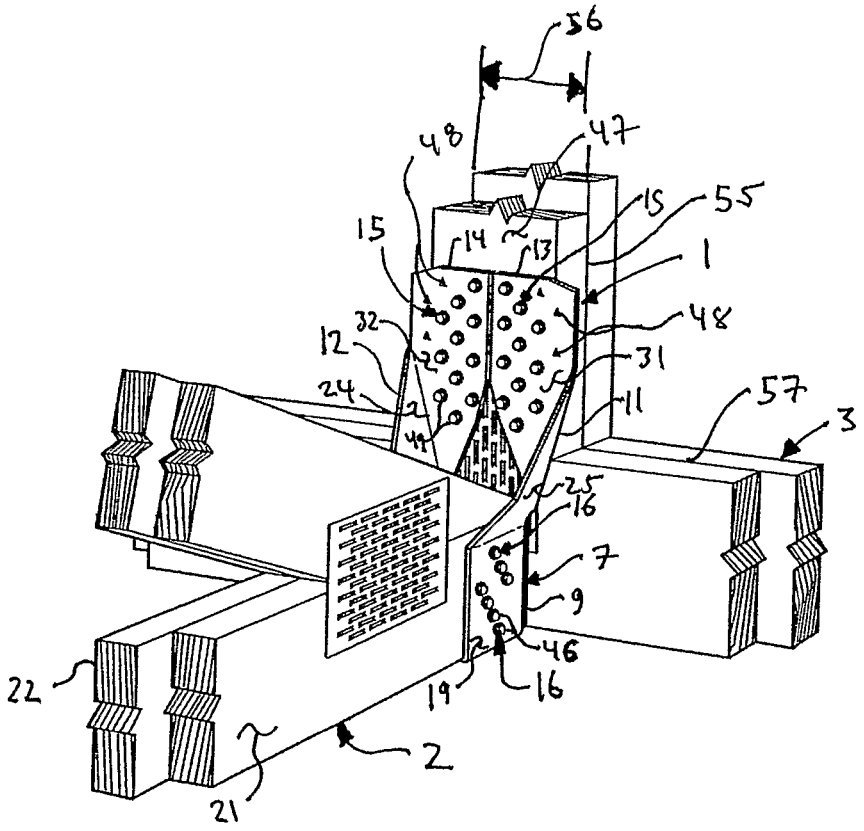
FIG. 2 is a perspective view of the hanger of the present invention connecting a supported member to a supporting member.

As shown in FIG. 2, this invention comprises a hanger 1 for connecting a held or supported member 2 to a holding or support member 3.

Figure 1:
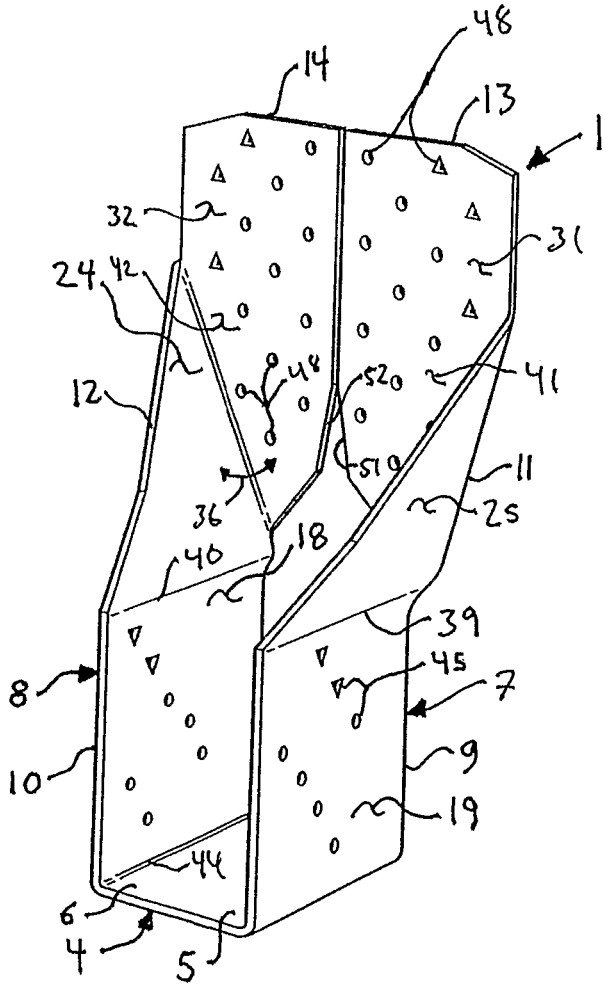
FIG. 1 is a perspective view of the hanger of the present invention.

As shown in FIGS. 1 and 2, in the preferred embodiment of the present invention, the hanger 1 consists of a seat member 4 adapted for supporting the held or supported member 2. A first side portion 5 of the seat member 4 is connected to a lower portion 9 of a first side member 7. An upper portion 11 of the first side member 7 is connected to a first back flange 13. The first back flange 13 is adapted to be connected to the supporting member 3 by one or more fasteners 15. A second side portion 6 of the seat member 4 is connected to a lower portion 10 of a second side member 8. An upper portion 12 of the second side member 8 is connected to a second back flange 14. The second back flange 14 is adapted to be connected to the supporting member 3 by one or more fasteners 15.

As shown in FIG. 1, in the preferred embodiment, the hanger 1 consists of a continuous, non-overlapped single seat member 4. In the preferred embodiment, the first side member 7 is integrally connected to a first side edge 43 of the seat member 4. In the preferred embodiment, the second side member 8 is integrally connected to a second side edge 44 of the seat member 4.

Figure 3:
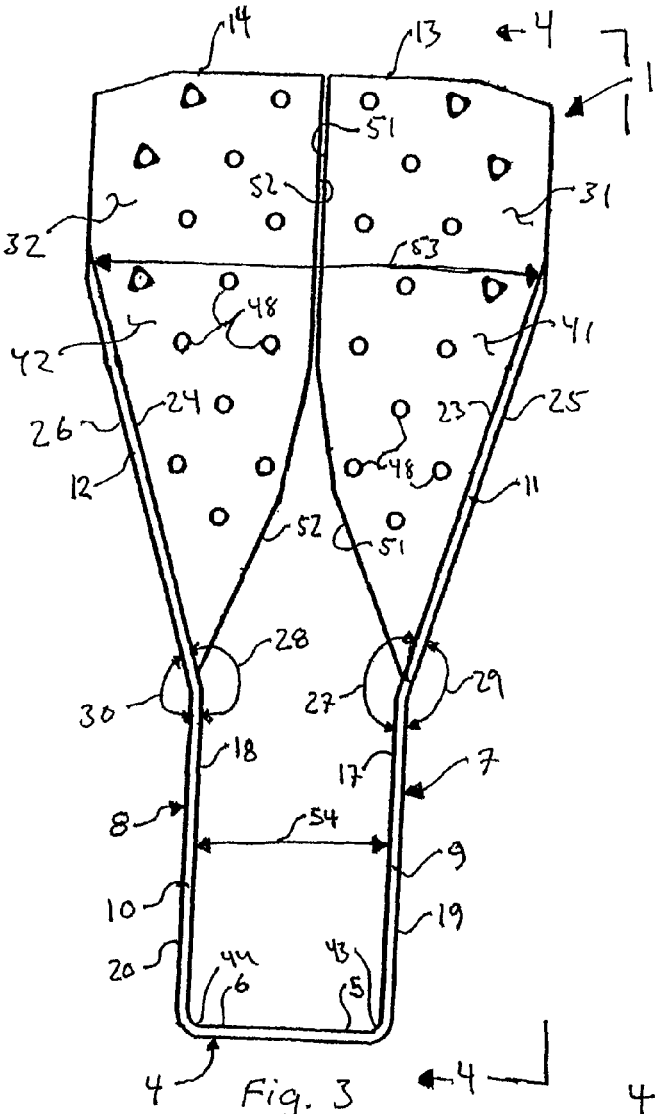
FIG. 3 is a front elevation of the hanger shown in FIG. 1.

As shown in FIG. 3, in the preferred embodiment, the lower portion 9 of the first side member 7 is formed with an outer face 19 disposed away from the supported member 2 and the lower portion 9 of the first side member 7 is formed with an inner face 17 that is disposed toward the supported member 2. In the preferred embodiment, the lower portion 9 of the first side member 7 is adapted so that at least portions of the inner face 17 of the lower portion 9 of the first side member 7 register with portions of a first side face 21 of the supported member 2.

In the preferred embodiment, the lower portion 10 of the second side member 8 is formed with an outer face 20 disposed away from the supported member 2 and the lower portion 10 of the second side member 8 is formed with an inner face 18 that is disposed toward the supported member 2. In the preferred embodiment, the lower portion 10 of the second side member 8 is adapted so that at least portions of the inner face 18 of the lower portion 10 of the second side member 8 register with portions of a second side face 22 of the supported member 2.

As shown in FIG. 1, in the preferred embodiment, openings 45 are provided in the lower portions 9 and 10 of the first and second side members 7 and 8 to receive fasteners 16 for attachment of the hanger 1 to the carried or supported member 2. In the preferred embodiment, the fasteners 16 for attaching the first and second side members 7 and 8 to the supported member 2 are self-drilling, threaded fasteners. Also, preferably, these fasteners 16 are each formed with a head 46, and when the fasteners 16 are driven into the supported member 2 the heads 46 of the fasteners 16 abut against the outer faces 19 and 20 of the lower portions 9 and 10 of the first and second side members 7 and 8 and the inner faces 17 and 18 of the lower portions 9 and 10 of the first and second side members 7 and 8 are pulled by the driving of the fasteners 16 towards the first and second side faces 21 and 22 of the supported member 2.

As shown in FIG. 3, in the preferred embodiment, the lower portions 9 and 10 of the first and second side members 7 and 8 form a generally orthogonal angle with the seat member 4, and are generally parallel to each other with the inner faces 17 and 18 of the lower portions 9 and 10 of the first and second side members 7 and 8 disposed towards each other and the outer faces 19 and 20 of the lower portions 9 and 10 of the first and second side members 7 and 8 disposed away from each other.

As shown in FIG. 1, in the preferred embodiment, the upper portion 11 of the first side member 7 is formed with an outer face 25 disposed away from the supported member 2 and the upper portion 11 of the first side member 7 is formed with an inner face 23 that is disposed toward the supported member 2. In the preferred embodiment, the upper portion 11 of the first side member 7 is adapted so that the inner face 23 of the upper portion 11 of the first side member 7 does not register with portions of a first side face 21 of the supported member 2.

In the preferred embodiment, the upper portion 12 of the second side member 8 is formed with an outer face 26 disposed away from the supported member 2 and the upper portion 12 of the second side member 8 is formed with an inner face 24 that is disposed toward the supported member 2. In the preferred embodiment, the upper portion 12 of the second side member 8 is adapted so that the inner face 24 of the upper portion 12 of the second side member 8 does not register with portions of a second side face 22 of the supported member 2.

As is best shown if FIG. 3, in the preferred embodiment, the inner face 17 of the lower portion 9 of the first side member 7 and the inner face 23 of the upper portion 11 of the first side member 7 form a reflex angle 27 that is greater than 180 degrees that is bounded by said inner face 17 of the lower portion 9 of the first side member 7, sweeps through said supported member 2 when it is held by the hanger 1 and is bounded by the inner face 23 of the upper portion 11 of the first side member 7. Similarly, in the preferred embodiment, the outer face 19 of the lower portion 9 of the first side member 7 and the outer face 25 of the upper portion 11 of the first side member 7 form an obtuse angle 29 that is bounded by said outer face 19 of the lower portion 9 of the first side member 7, sweeps away from the hanger 1 and is bounded by the outer face 25 of the upper portion 11 of the first side member 7.

As is best shown in FIG. 3, in the preferred embodiment, the inner face 18 of the lower portion 10 of the second side member 8 and the inner face 24 of the upper portion 12 of the second side member 8 form a reflex angle 28 that is greater than 180 degrees and is bounded by said inner face 18 of the lower portion 10 of the second side member 8, sweeps through said supported member 2 when it is held by the hanger 1 and is bounded by the inner face 24 of the upper portion 12 of the second side member 8. Similarly, in the preferred embodiment, the outer face 20 of the lower portion 10 of the second side member 8 and the outer face 26 of the upper portion 12 of the second side member 8 form an obtuse angle 30 that is bounded by said outer face 20 of the lower portion 10 of the second side member 8, sweeps away from the hanger 1, and is bounded by the outer face 26 of the upper portion 12 of the second side member 8.

Figure 5:
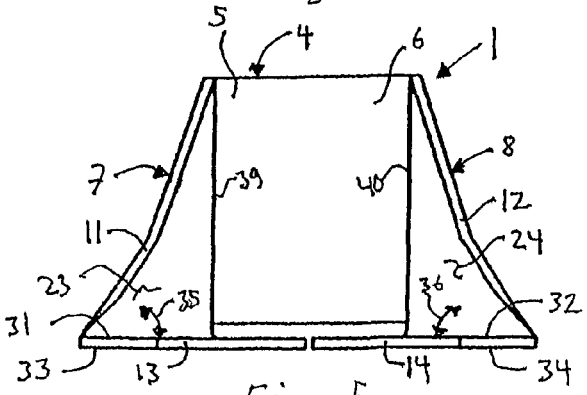
FIG. 5 is a top view of the hanger shown in FIG. 2.

As is best shown in FIG. 5, in the preferred embodiment, the first back flange 13 is formed with an exposed face 31 and a registration or attachment face 33. In the preferred embodiment, when the hanger 1 is attached to a supporting member 3, a substantial portion of the registration face 33 of the first back flange 13 is adapted to register with an attachment face 47 of the supporting member 3.

In the preferred embodiment, the second back flange 14 is formed with an exposed face 32 and a registration or attachment face 34. In the preferred embodiment, when the hanger 1 is attached to a supporting member 3, a substantial portion of the registration face 34 of the second back flange 14 is adapted to register with the attachment face 47 of the supporting member 3.

In the preferred embodiment, openings 48 are provided in the first and second back flanges 13 and 14 to receive fasteners 15 for attachment of the hanger 1 to the holding or supporting member 3. In the preferred embodiment, the fasteners 15 for attaching the first and second back flanges 13 and 14 to the supported member 3 are self-drilling, threaded fasteners. Also, preferably, these fasteners 15 are each formed with a head 49, and when the fasteners 15 are driven into the supporting member 3 the heads 49 of the fasteners 15 abut against the exposed faces 31 and 32 of the first and second back flanges 13 and 14 and the registration faces 33 and 34 of the first and second back flanges 13 and 14 are pulled by the driving of the fasteners 15 towards the attachment face of the supporting member 47.

Figure 4:
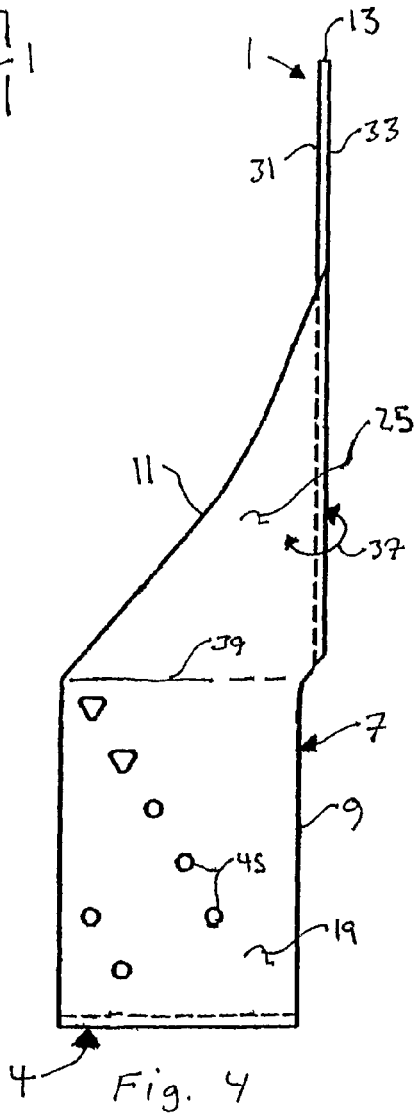
FIG. 4 is a left side view of the hanger shown in FIG. 3 taken along line 4-4.

As shown in FIG. 4, In the preferred embodiment, the first and second back flanges 13 and 14 are orthogonally disposed to the upper and lower portions 9, 10, 11 and 12 of the first and second side members 7 and 8.

Also, in the preferred embodiment, the exposed face 31 of the first back flange 13 and the inner face 23 of the upper portion H of the first side member 7 form a right angle 35 of 90 degrees that is bounded by the inner face 23 of the upper portion H of the first side member 7 and is bounded by the exposed face 31 of the first back flange 13.

Similarly, in the preferred embodiment, the registration face 33 of the first back flange 13 and the outer face 25 of the upper portion 11 of the first side member 7 form an angle 37 of 270 degrees that is bounded by the outer face 25 of the upper portion 11 of the first side member 7 sweeps through the supporting member 3 when the hanger 1 is attached to the supporting member 3 and is bounded by the registration 33 face of the first back flange 13.

Also, in the preferred embodiment, the exposed face 32 of the second back flange 14 and the inner face 24 of the upper portion 12 of the second side member 8 form a right angle 36 of 90 degrees that is bounded by the inner face 24 of the upper portion 12 of the second side member 8 and is bounded by the exposed face 32 of the second back flange 14. Similarly, in the preferred embodiment, the registration face 34 of the second back flange 14 and the outer face 26 of the upper portion 12 of the second side member 8 form an angle of 270 degrees that is bounded by the outer face 26 of the upper portion 12 of the second side member 8 sweeps through the supporting member 3 when the hanger 1 is attached to the supporting member 3 and is bounded by the registration face 34 of the second back flange 14.

In the preferred embodiment, the first and second back flanges 13 and 14 are separate members that are not connected to each other except through their respective connections to the first and second side members 7 and 8 which are in turn connected to the seat member 4.

In the preferred embodiment, the first back flange 13 is formed with an opposing free edge 51, and the second back flange 14 is formed with an opposing free edge 52. In the preferred embodiment the opposing edges 51 and 52 of the first and second back flanges 13 and 14 are spaced apart from each other.

As shown in FIG. 2, in the preferred embodiment, the first and second side members 7 and 8 extend a substantial distance above the seat member 4, providing substantial lateral support to the supported member 2.

In the preferred embodiment, the upper portions 11 and 12 of the first and second side members 7 and 8 are separated from and differentiated from the lower portions 9 and 10 of the first and second side members 7 and 8 by transverse bends 39 and 40 in the first and second side members 7 and 8. In the preferred embodiment, these transverse bends 39 and 40 in the first and second side members 7 and 8 create reflex angles between 190 and 197 degrees between the inner faces 17 and 23 and 18 and 24 of the upper and lower portions 9 and 11 and 10 and 12 of the first and second side members 7 and 8.

As shown in FIG. 3, in the preferred embodiment, the upper portions 11 and 12 of the first and second side members 7 and 8 extend a substantial distance away from the seat member 4 and above the transverse bends 39 and 40 that separate the upper portions 11 and 12 of the first and second side members 7 and 8 from the lower portions 9 and 10 of the first and second side members 7 and 8.

In the preferred embodiment, the portions of the first and second back flanges 13 and 14 that are disposed between the upper portions 11 and 12 of the first and second side flanges 7 and 8 and do not extend above the side flanges 7 and 8 are considered the lower portions 41 and 42 of the first and second back flanges 13 and 14.

In the preferred embodiment, the lower portions 41 and 42 of the first and second back flanges 13 and 14 between the upper portions 11 and 12 of the first and second side members 7 and 8 span a width 53 that is greater than the width 54 between the lower portions 9 and 10 of the first and second side members 7 and 8.

In the preferred embodiment, the upper portions 11 and 12 of the first and second side members 7 and 8 span a maximum selected width 53, and the lower portions 9 and 10 of the first and second side members 7 and 8 span a second width 54 and the maximum selected width 53 between the upper portions 11 and 12 of the first and second side members 7 and 8 is greater than the width 54 between the lower portions 9 and 10 of the first and second side members 7 and 8.

In the preferred embodiment, the lower portions 41 and 42 of the back flanges 13 and 14 do not overlap each other, and the lower portions 41 and 42 are adapted to have multiple fasteners 15 driven through each of them into the supporting member 3. In the preferred embodiment, the second back member 14 is parallel and substantially aligned with the first back member 13.

In the preferred embodiment, the lower portions 41 and 42 of the first and second back flanges 13 and 14 are only attached to the first and second side members 7 and 8 at the upper portions 11 and 12 of the first and second side members 7 and 8 above the transverse bend lines 39 and 40. In the preferred embodiment, the lower portions 41 and 42 of the first and second back flanges 13 and 14 are connected to the upper portions 11 and 12 of the first and second side members 7 and 8 close to the transverse bends 39 and 40 in the first and second side members 7 and 8.

Preferably, the hanger 1 of the present invention is constructed from a single blank member of galvanized sheet steel (7 Gauge G90) without requiring any welding or painting. In the preferred embodiment, the hanger 1 is formed by bending along substantially straight bend lines and all bends have a radius of one thickness of the metal.

In the preferred embodiment, the hanger 1 is designed for attachment to a vertically elongated member 55 that is part of the larger supporting member 3 such as a webbed truss. In the preferred embodiment, the vertically disposed, elongated member is a web member 55 of the truss. In the preferred embodiment, the vertically disposed, elongated member 55 of the supporting truss has a selected maximum width 56 for the receipt of fasteners 15 for attaching the hanger 1 to the supporting member.

In the preferred embodiment, the first and second back flanges 13 and 14 are disposed a selected distance above the seat member 4 of the hanger 1. When the supporting member 3 is a truss formed with a bottom chord 57, a top chord and web members 55 connecting the top and bottom chords, it is desirable to not connect the hanger 1 to the bottom chord 57 of the truss 3. In the preferred embodiment of the hanger 1 which is designed for attaching to a truss 3 having a bottom chord 57 from wood having a nominal height of 6", the first and second back flanges 13 and 14 are preferably formed a selected distance above the seat member 4 and the lowest of the openings 48 in the first and second back members 13 and 14 for receiving a fastener 15 is disposed above 6" from the seat member 4. In the preferred embodiment the supporting member 3 and the supported member 2 are multi-ply girder trusses made from Southern Pine or an equivalent, and the fasteners used are Simpson Strong-Drive SDS ¼×3 fasteners. The minimum width of the vertical web member of the 55 of the supporting member 3 is nominally 6 inches in width as in a standard 2×6 piece of US lumber.

The hanger 1 of the preferred embodiment is formed on an progressive die with minimal waste of the sheet metal from which the blanks are made by taking a sheet metal blank, bending the first and second side members 7 and 8 downwardly from the seat member 4, bending the upper portions 11 and 12 of the first and second side members 7 and 8 upwardly from the lower portions 9 and 10 of the first and second side members 7 and 8, and then bending the first and second back members 13 and 14 downwardly from the upper portions 11 and 12 of the first and second side members 7 and 8. Openings 45 and 48 are provided in the hanger 1 for receiving fasteners 15 and 16 at designated points.

I claim:

1. A connection comprising:

a. a held member;

b. a supporting member; and c. a hanger, said hanger, comprising: a seat member supporting said held member, said seat member having first and second side portions;

d. a first side member integrally connected to said first side portion of the seat member at a first side edge of the seat member, the first side member having a transverse bend line that divides the first side member into a lower, planar portion and an upper, planar portion, and the lower, planar portion of the first side member being connected to the first side portion of the seat member, the lower, planar portion of the first side member having an inner face and an outer face, the lower, planar portion of the first side member forming a generally orthogonal angle with the seat member and extending above the seat member and along the held member to provide lateral support to the held member;

e. the upper, planar portion of the first side member being connected to a first back flange, the upper, planar portion of the first side member having an inner face and an outer face;

f. the first back flange being substantially planar and connected to said supporting member by a plurality of fasteners;

g. a second side member integrally connected to said second side portion of the seat member at a second side edge of the seat member, the second side member having a transverse bend line that divides the second side member into a lower, planar portion and an upper, planar portion, and the lower, planar portion of the second side member being connected to the second side portion of the seat member, the lower, planar portion of the second side member having an inner face and an outer face, the inner face of the second side member being disposed towards the inner face of the first side member, the lower, planar portion of the second side member forming a generally orthogonal angle with the seat member and being generally parallel to the lower, planar portion of the first side member and extending above the seat member and along the held member to provide lateral support to the held member, the upper, planar portions of the first and second side members extend outwardly to define a maximum selected width, and the lower, planar portion of the first and second side members define a second width, and the maximum selected width between the upper, planar portions of the first and second side members is greater than the width between the lower, planar portions of the first and second side members;

h. the upper, planar portion of the second side member being connected to a second back flange, the upper portion of the second side member having an inner face and an outer face, the inner face of the upper portion of the second side member being disposed towards the inner face of the upper portion of the first side member;

i. the second back flange being connected to the supporting member by a plurality of fasteners, the second back flange being substantially planar and separate from the first back flange while being parallel and substantially aligned with the first back flange; wherein j. the inner face of the lower, planar portion of the first side member and the inner face of the upper, planar portion of the first side member form a reflex angle and the inner face of the lower, planar portion of the second side member and the inner face of the upper, planar portion of the second side member form a reflex angle;

k. the first and second back flanges are only attached to the first and second side members at the upper, planar portions of the first and second side members above the transverse bend lines, the first and second back flanges have lower, planar portions that are disposed between the upper, planar portions of the first and second side members and the lower portion of the first back flange extending past the inner face of the lower, planar portion of the first side member and past the first side edge of the seat member toward the second side member, and the lower portion of the second back flange extending past the inner face of the lower, planar portion of the second side member and past the second side edge of the seat member toward the first side member such that the lower portions of the first and second back flanges together substantially span the maximum selected width between the upper, planar portions of the first and second side members, and the lower portions of the first and second back flanges are each connected to the supporting member by a first plurality of fasteners that are disposed vertically separated and above the seat member and are disposed between the first and second side edges of the seat member, and the lower portion of the first back flange is also connected to the supporting member by a second plurality of fasteners that are disposed vertically separated and above the lower, planar portion of the first side member and disposed outside of the area directly above the seat member and disposed on the same side and away from the outer face of the lower, planar portion of the first side member with *one or more* upper fasteners of the second plurality of fasteners being laterally farther away from the outer face of the lower, planar portion of the first side member than *one or more* lower fasteners of the second plurality of fasteners, and the lower portion of the second back flange is also connected to the supporting member by a third plurality of fasteners that are disposed vertically separated and above the lower, planar portion of the second side member and disposed outside of the area directly above the seat member and disposed on the same side and away from the outer face of the lower, planar portion of the second side member, with *one or more* upper fasteners of the third plurality of fasteners being laterally farther away from the outer face of the lower, planar portion of the first side member than *one or more* lower fasteners of the third plurality of fasteners; and l. the first back flange is formed with an exposed face and a registration face;

m. the second back flange is formed with an exposed face and a registration face;

n. the exposed face of the first back flange and the inner face of the upper, planar portion of the first side member form a right angle of 90 degrees that is bounded by the inner face of the upper, planar portion of the first side member and is bounded by the exposed face of the first back flange, and o. the exposed face of the second back flange and the inner face of the upper, planar portion of the second side member form a right angle of 90 degrees that is bounded by the inner face of the upper, planar portion of the second side member and is bounded by the exposed face of the second back flange.

2. The connection of claim 1, wherein:

openings are provided in the lower, planar portions of the first and second side members which receive fasteners for attachment of the hanger to the held member.

3. The connection of claim 1, wherein:

the supporting member has a vertically elongated member to which the hanger is attached that is subtantially as narrow as the maximum selected width between the upper, planar portions of the first and second side members.

4. The connection of claim 1, wherein:

a. the reflex angles between the inner face of the lower, planar portion of the first side member and the inner face of the upper, planar portion of the first side member is between 190 and 197 degrees, and b. the reflex angles between the inner face of the lower, planar portion of the second side member and the inner face of the upper, planar portion of the second side member is between 190 and 197 degrees.

* * * * *